United States Patent
Higashida et al.

(10) Patent No.: US 6,514,437 B1
(45) Date of Patent: Feb. 4, 2003

(54) STAMPER PROTECTING LAYER FOR OPTICAL DISK MOLDING APPARATUS, OPTICAL DISK MOLDING APPARATUS AND OPTICAL DISK MOLDING METHOD USING THE STAMPER PROTECTING LAYER

(75) Inventors: Takaaki Higashida, Kadoma (JP); Shinji Kadoriku, Takarazuka (JP); Hiroshi Yutani, Katano (JP); Yoshio Maruyama, Kyoto (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/572,695

(22) Filed: May 16, 2000

Related U.S. Application Data

(62) Division of application No. 09/059,441, filed on Apr. 14, 1998, now Pat. No. 6,099,287.

(30) Foreign Application Priority Data

Apr. 16, 1997  (JP) ................................................. 9-98725

(51) Int. Cl.⁷ .............................................. B29D 11/00
(52) U.S. Cl. ....................................... 264/1.33; 264/2.5
(58) Field of Search ............................... 264/1.33, 106, 264/107, 2.5; 425/810

(56) References Cited

U.S. PATENT DOCUMENTS 5,700,501 A    12/1997   Miyairi

FOREIGN PATENT DOCUMENTS

| EP | 0 640 458 |   | 3/1995 |
|---|---|---|---|
| EP | 0 796 713 |   | 9/1997 |
| JP | 60-151852 | * | 8/1985 |
| JP | 60-208041 |   | 9/1985 |
| JP | 63-170849 |   | 7/1988 |
| JP | 3-114806 | * | 5/1991 |
| JP | 3-292317 |   | 10/1991 |
| JP | 5-16192 | * | 1/1993 |
| JP | 6-198373 |   | 8/1994 |
| JP | 7-127352 |   | 4/1995 |

OTHER PUBLICATIONS

The Condensed Chemical Dictionary Ninth Edition, Revised by Gessner G. Hawley, Van Notrand Reinhold Company, NY, pp. 523, 636, 781, 865, 866, 896, 1977.

* cited by examiner

*Primary Examiner*—Mathieu D. Vargot
(74) *Attorney, Agent, or Firm*—Wenderoth, Lind & Ponack, L.L.P.

(57) ABSTRACT

A stamper protecting layer is interposed between a mold and a stamper of an optical disk molding apparatus, so that forces generated by extension and shrinkage of the stamper relative in a diametrical direction of the stamper to the mold when an optical disk is molded are absorbed by the stamper protecting layer, with this arrangement, the stamper is prevented from being deformed. Accordingly quality and production of the optical disks are improved.

3 Claims, 4 Drawing Sheets

STAMPER PROTECTING LAYER FOR OPTICAL DISK MOLDING APPARATUS, OPTICAL DISK MOLDING APPARATUS AND OPTICAL DISK MOLDING METHOD USING THE STAMPER PROTECTING LAYER

This is a divisional application of Ser. No. 09/059,441, filed Apr. 14, 1998, now U.S. Pat. No. 6,099,287.

BACKGROUND OF THE INVENTION

The present invention relates to a stamper protecting layer set in a molding apparatus for use in molding an optical disk, an optical disk molding apparatus with the stamper protecting layer, and an optical disk molding method carried out with the optical disk molding apparatus.

Conventionally, optical disks are molded by a molding apparatus 1 shown in FIG. 6. The molding apparatus 1 is in a concentric structure with respect to a center axis 4, and therefore a part of the apparatus to the left of the center axis 4 is not illustrated in FIG. 6. The molding apparatus 1 has two molds 2 and 10 made of steel materials, for example a stainless steel. The mold 2 is movable for opening and includes a stamper 3 for forming pits representing recording information on an optical disk to be molded. The mold 10 is fixed and has a sprue 6 to inject a resin therethrough to form the optical disk.

The optical disk is molded with the use of the above molding apparatus 1 in a manner as will be described hereinbelow. After the stamper 3 is set to the mold 2, the resin is injected through the sprue 6 to a cavity 5 defined between the closed molds 2 and 10 where the optical disk is molded. Concaves and convexes 9 formed on the stamper 3 are transferred to the resin. After the transfer of the concaves and convexes 9, the filled resin is cooled and then the mold 2 is opened. When the mold 2 is completely opened, both the resin present in the sprue 6 and a molded body formed by the cavity 5 which becomes the optical disk are pressed up by an ejection rod 7, to thereby separate the molded body from the mold 2. After the ejection, the molded body is carried outside the molding apparatus 1 by a take-out device.

In a sequence of the above processes, when the resin supplied through the sprue 6 is filled into the cavity 5, a tensile force acting in a radial direction of the stamper 3 because of a viscosity of the resin and a thermal stress due to temperature changes during the repeated heating and cooling are exerted to the stamper 3. Meanwhile, the tensile force due to the viscosity of the resin and the thermal stress do not act on the mold 2. As a result of this, a friction force is brought about between the mold 2 and stamper 3 in a direction I which is a diametrical direction of the optical disk, thereby wearing the stamper 3 and mold 2 at a contact part 8. The wear is generally called an adhesive wear, which involves digging into the mold 2 and stamper 3. Namely, microscopically, contact surfaces of the stamper 3 and mold 2 are not completely flat and have irregularities. Thus, projections in the irregularities cause the formation of adhesive portions and then the adhesive portions formed between the stamper 3 and mold 2 cause digging out from (i.e. wear of) the stamper 3 or mold 2 due to the friction force in the I direction. Because of projections and recesses formed consequent to the wear, as shown in FIG. 7, several-$\mu$m projecting parts 21 are formed at the contact part 8 of the mold 2 and thus projecting parts 22 corresponding to the projecting parts 21 appear at a recording face 9a of the stamper 3 having the above-mentioned concaves and convexes 9. The projecting parts 22 at the recording face 9a are transferred to the molded body. Therefore, if the projecting parts 22 at the recording face 9a exceed a tolerance, the molded body is rejected, which leads to a yield decrease. The stamper 3 is required to be exchanged when characteristics of the molded body are over an acceptable limit.

However, it takes considerable time to exchange the stamper 3, lowering productivity of optical disks. The number of exchange times for the stamper 3 should thus be reduced. To cope with this, a surface 2a of the mold 2 is coated in some cases to restrict the wear at the contact part 8 between the stamper 3 and mold 2. TiN is primarily used for the coating. While a wear resistance of the surface 2a of the mold 2 is improved in the presence of the coating layer, the TiN is adhered to the surface 2a of the mold 2 by plasma vapor deposition, in other words, an adhesive force of the TiN to the mold 2 is not strong. As such, if the coating layer is partly separated by the above-discussed friction force in the I direction, an abrasive wear acting on the stamper 3 by the separated TiN is stronger because the TiN has a hardness as large as approximately ten times the hardness of the stamper 3. The cut waste of the stamper 3 scraped off by the separated TiN produces the projecting parts 22 of the recording face 9a of the stamper 3, similar to the previously-mentioned case. With the use of the coating layer, although the stamper 3 undergoes less adhesive wear, the separated TiN brings about projecting parts 22 on the recording face 9a, making it difficult to secure mechanical characteristics of the optical disk as the molded body.

For solving the above disadvantages, fats and oils such as wax or the like, or lubricant oil are sometimes applied to the surface 2a of the mold 2. However, the fats and oils such as wax or the like lack stability under high temperature for a long time. Moreover, the fats and oils emit moisture contained therein when heated, thus adversely influencing the stamper 3 or mold 2. To uniformly apply the fats and oils to the surface 2a of the mold 2 is a difficult task, and reproducibility is poor. In addition, foreign matter such as dust, etc. readily adhere to the fats and oils to thereby decrease the quality of the molded body. Metallic components contained in a mineral oil which is a kind of the lubricant oil react to and affect the stamper 3 and mold 2.

SUMMARY OF THE INVENTION

The present invention is devised to solve the above-described disadvantages, and has for its object to provide a stamper protecting layer for a molding apparatus for an optical disk, an optical disk molding apparatus with the stamper protecting layer and an optical disk molding method which improve quality and production of optical disks.

According to a first aspect of the present invention, there is provided a stamper protecting layer arranged on a whole surface of a stamper opposed to a first mold of molds for molding an optical disk and interposed between the first mold and the stamper fitted to the first mold to form pits representing recording information on the optical disk.

The stamper protecting layer is so constructed as to absorb forces generated by extension and shrinkage of the stamper in a diametrical direction of the stamper relative to the first mold thereby preventing the stamper from being deformed upon molding of the optical disk.

According to the first aspect of the present invention, the stamper protecting layer is provided between the stamper and the first mold so as to absorb the forces generated by extension and shrinkage of the stamper relative to the mold in the diametrical direction of the stamper, to thereby prevent the stamper from being deformed when the optical disk is molded. The stamper protecting layer eliminates direct contact between the stamper and the first mold and absorbs the forces generated by extension and shrinkage of the stamper upon molding. The stamper is prevented from being deformed which would otherwise be caused by the projections and recesses consequent to the wear digging of the stamper or the first mold.

Accordingly, the quality and production of optical disks manufactured with the use of the stamper are improved.

According to a second aspect of the present invention, there is provided an optical disk molding apparatus comprising:

molds for molding an optical disk;

a stamper for being fitted to a first mold of the molds to form pits representing recording information on the optical disk; and a stamper protecting layer arranged on a whole surface of the stamper opposed to the first mold and interposed between the first mold and the stamper, and being so constructed as to absorb forces generated by extension and shrinkage of the stamper in a diametrical direction of the stamper relative to the first mold thereby preventing the stamper from being deformed upon molding of the optical disk.

According to a third aspect of the present invention, there is provided an optical disk molding method comprising:

injecting a resin material for forming of an optical disk into molds for molding the optical disk, the molds having a stamper protecting layer between a first mold of the molds and a stamper fitted to the first mold to form pits representing recording information on the optical disk; and absorbing forces generated by extension and shrinkage of the stamper in a diametrical direction of the stamper by the stamper protecting layer when the resin material is injected to thereby prevent the stamper from being deformed.

According to the molding apparatus in the second aspect of the present invention and the molding method in the third aspect of the present invention, owing to the stamper protecting layer of the first aspect, the forces generated by extension and shrinkage of the stamper in the diametrical direction of the stamper relative to the first mold when the optical disk is molded are absorbed, so that the stamper is prevented from being deformed. Accordingly, the quality and production of optical disks manufactured with the use of the stamper are improved.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
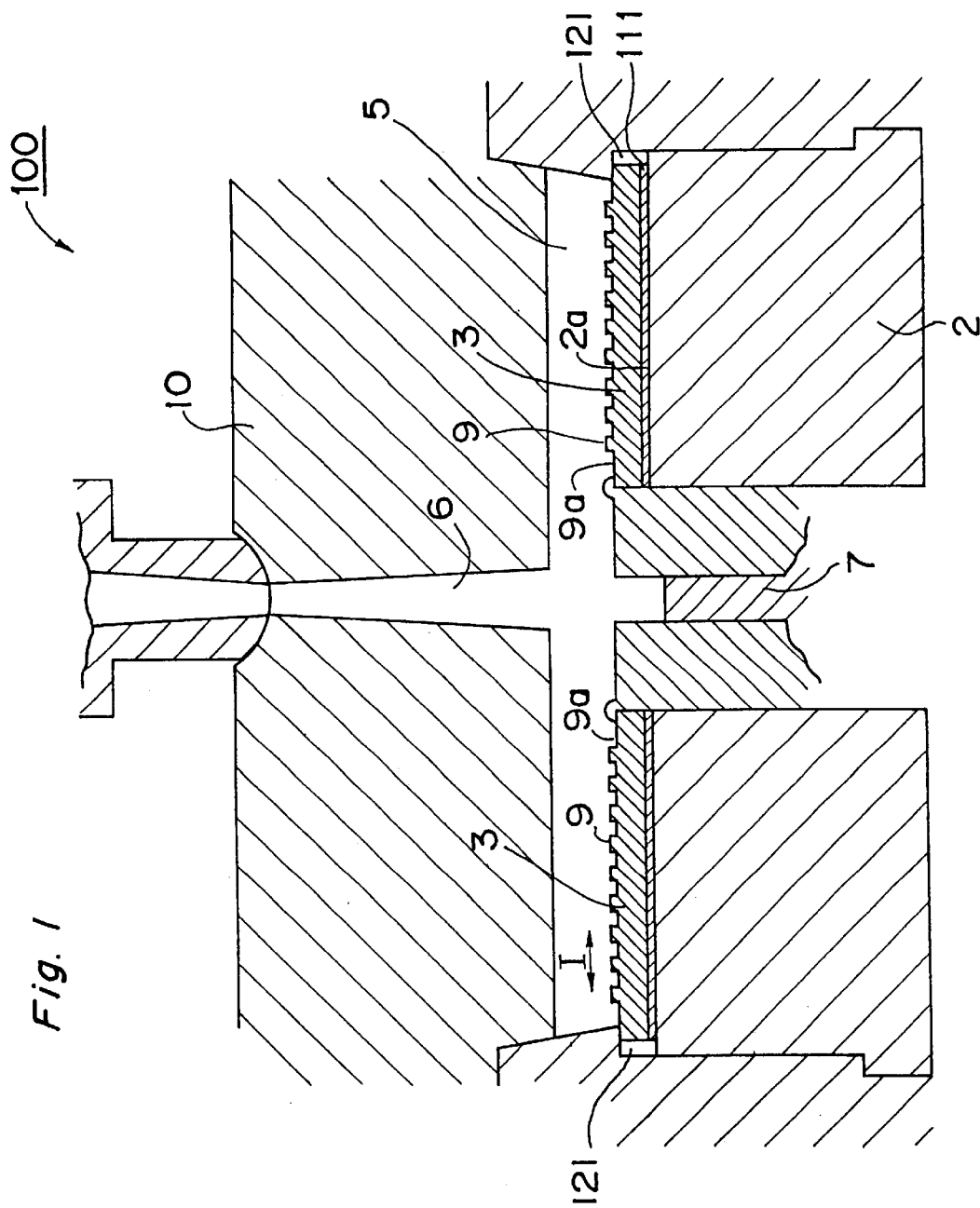
FIG. 1 is a sectional view showing a structure of an optical disk molding apparatus provided with a stamper protecting layer according to an embodiment of the present invention.

Before the description of the present invention proceeds, it is to be noted that like parts are designated by like reference numerals throughout the accompanying drawings.

A stamper protecting layer, an optical disk molding apparatus with the stamper protecting layer and an optical disk molding method in preferred embodiments of the present invention will be described hereinbelow with reference to the drawings. The optical disk molding method is carried out in the optical disk molding apparatus.

FIG. 1 shows the optical disk molding apparatus 100 according to an embodiment of the present invention. The optical disk molding apparatus 100 is different from the conventional optical disk molding apparatus 1 in that a stamper protecting layer 111 to be detailed later is provided. The optical disk molding apparatus 100 is otherwise the same in structure as the optical disk molding apparatus 1. More specifically, the optical disk molding apparatus 100 includes the fixed mold 10 with the sprue 6, the movable mold 2 constituting a first mold and opposed to the mold 10, the stamper 3 and the ejection rod 7. In the meantime, the stamper protecting layer 111 is interposed between the mold 2 and stamper 3 in the optical disk molding apparatus 100. While the stamper protecting layer 111 has preferably the same planar shape as the stamper 3, the stamper protecting layer 111 is arranged in the stamper 3 at least to correspond to an information area where information to be transferred to an optical disk is written. The stamper protecting layer 111 is uniform in thickness over the whole circumference thereof.

As described earlier, at the time of molding the optical disk, the stamper 3 is extended and shrunk in the I direction (which is the diametrical direction thereof) by the tensile stress due to the viscosity of the resin material filled in the cavity 5 and thermal stress due to the heating and cooling temperatures acting repeatedly.

The stamper protecting layer 111 may be formed of a wear preventing member 112 for absorbing forces produced by extension and shrinkage of the stamper 3 in the I direction and preventing the stamper 3 from being deformed when the optical disk is molded. The wear preventing member 112 is formed of a material which undergoes change in its physical properties at a temperature not higher than an injection temperature of the resin material when injected into the cavity 5, preferably a metal having a melting point not higher than the injection temperature. The change in physical properties referred to above is, for instance, melting, softening, etc. of the material, and the injection temperature is 370° C. according to the embodiment.

Figure 2:
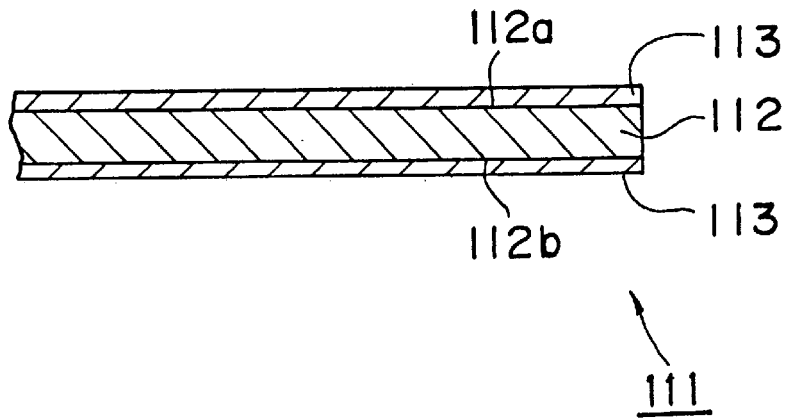
FIG. 2 is a sectional view of a modified example of the stamper protecting layer of FIG. 1.

When the wear preventing material 112 is formed of a metal, the wear preventing material 112 can be a doughnut-like thin disk of, for example, indium, lead, tin or the like. In the case where the wear preventing member 112 is formed of a metallic material which reacts chemically with the mold 2 and stamper 3, the wear preventing member 112, and the mold 2 and stamper 3 diffuse and react at contact faces therebetween and consequently integrate with each other to thereby deform the recording face 9a of the stamper 3. In such case as above, as shown in FIG. 2, reaction preventing material layers 113 of a compound containing at least one of carbon, nitrogen and boron are preferably arranged at front and rear faces 112a, 112b of the wear preventing member 112 in a thickness direction of the wear preventing member 112 so as to prevent the reaction. The reaction preventing material 113 is, e.g., TiC or tungsten carbide or the like.

Figure 3:
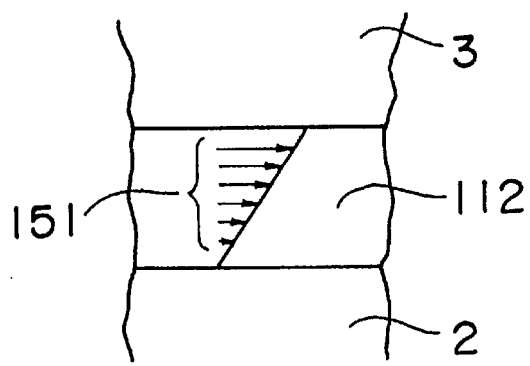
FIG. 3 is a diagram explanatory of a size of a force acting upon molding of an optical disk on a wear preventing member constituting the stamper protecting layer of FIG. 1.

The wear preventing member 112 formed of the metal between the mold 2 and stamper 3 is effective as follows. When the resin material is filled in the cavity 5, the stamper 3 is extended and shrunk in the I direction as discussed above, whereas the mold 2 is not extended nor shrunk. The extension and shrinkage of the stamper 3 generate work forces produced by extension and shrinkage to the wear preventing member 112 between the stamper 3 and mold 2. Since the wear preventing member 112 is formed of the metallic material having a melting point at the injection temperature of the resin material or lower, the wear preventing member 112 experiences a phase change from solid to liquid when the resin material is filled in the cavity 5. Consequently, a force 151 generated in the wear preventing member 112 becomes large at the side of the stamper 3 and decreases at the side of the mold 2, as shown in FIG. 3. The resulting deformation of the wear preventing member 112 distributes or eliminates a friction force between the stamper 3 and wear preventing member 112 and the energy of a pressure generated by the injection of the resin material, etc. Accordingly, the load acting on the stamper 3 is reduced and the life of the stamper 3 is elongated.

Although the conventional stamper can produce only about 30,000 optical disks, the structure of the embodiment enables production of approximately 100,000 optical disks, thus improving productivity and quality and yield of products.

As indicated in FIG. 1, a gap part 121 is provided in the mold 2 at an outer circumferential part of the stamper 3. The gap part 121 is a space for absorbing extension of the stamper 3 or a positional shift of the stamper 3 when fitted to the mold 2. If a surplus portion of the wear preventing member is produced when the wear preventing member 112 is melted, the gap part 121 can store the excessive wear preventing member portion. If a thickness of the wear preventing member 112 to be fitted is unknown, the wear preventing member 112 is prepared in a larger size and the surplus portion of the member 112 generated when melted can be allowed to flow to the gap part 121.

Depending on conditions when the optical disk is formed, the wear preventing member 112 will need to be a compound of tin, lead, etc., and if the wear preventing member 112 of the material is brought in direct contact with the stamper 3, the stamper 3 is deteriorated in molding operations of about 100 times. However, the reactions between the wear preventing member 112 and, the stamper 3 and mold 2 are prevented owing to the reaction preventing material layers 113 of a metallic coat of, e.g., tungsten carbide at the front and rear faces 112a and 112b of the wear preventing member 112. The life of the stamper 3 is accordingly extended.

Figure 4:
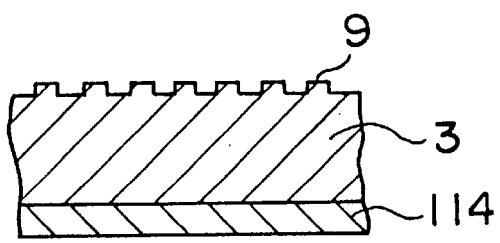
FIG. 4 is a sectional view of a further modified example of the stamper protecting layer of FIG. 1.

Although the stamper protecting layer 111 is handled as a separate single member as above, a wear preventing member 114 may be directly coated on the contact face of the stamper 3 which faces the mold 2, as illustrated in FIG. 4. The wear preventing member 114 is a layer of a compound containing at least one of carbon, boron and nitrogen, for example, a metallic coating film of titanium nitride.

Because of the presence of the wear preventing member 114, a friction coefficient between the stamper 3 and mold 2 is lowered to thereby to reduce the friction force, prevent the wear and reduce the deterioration of the stamper 3. In the event the wear preventing member 114 is the metallic coating film of titanium nitride, the wear preventing member 114 shows 3500–10000 Hk (Knoop hardness) and therefore is never worn even if metallic oxide particles are generated at a sliding face which is the contact face between the wear preventing member 114 and mold 2. The wear preventing member 114 is not damaged even when dust or the like adhering thereto is removed by means of a cloth or the like. Molded optical disks are of stabilized quality. Although the metallic coating film of titanium nitride is used in the above example, a good result is obtained also with the use of a titanium carbide film, a tungsten carbide film, etc.

As described above, when the wear preventing member 114 is provided at the contact face of the stamper 3 which faces mold 2 and since the wear preventing member 114 is very hard, the wear preventing member 114 is not damaged. Eventually, a fear that the projecting and recesses will occur and be transferred to the disks is eliminated. So, the stamper 3 becomes convenient to use, for example, in terms of maintenance, exchange and the like. The optical disks are stabilized in quality and obtained with improved productivity.

In the above example, the wear preventing member 114 is formed of the metallic coating film to the stamper 3. Alternatively, an element such as cobalt, molybdenum, phosphorus, etc. can be added to the stamper 3 to increase a hardness of the stamper 3, whereby the same effect as above is realized.

The following description is related to a case where the stamper protecting layer 111 is formed of a wear preventing liquid containing fatty acid.

Figure 5:
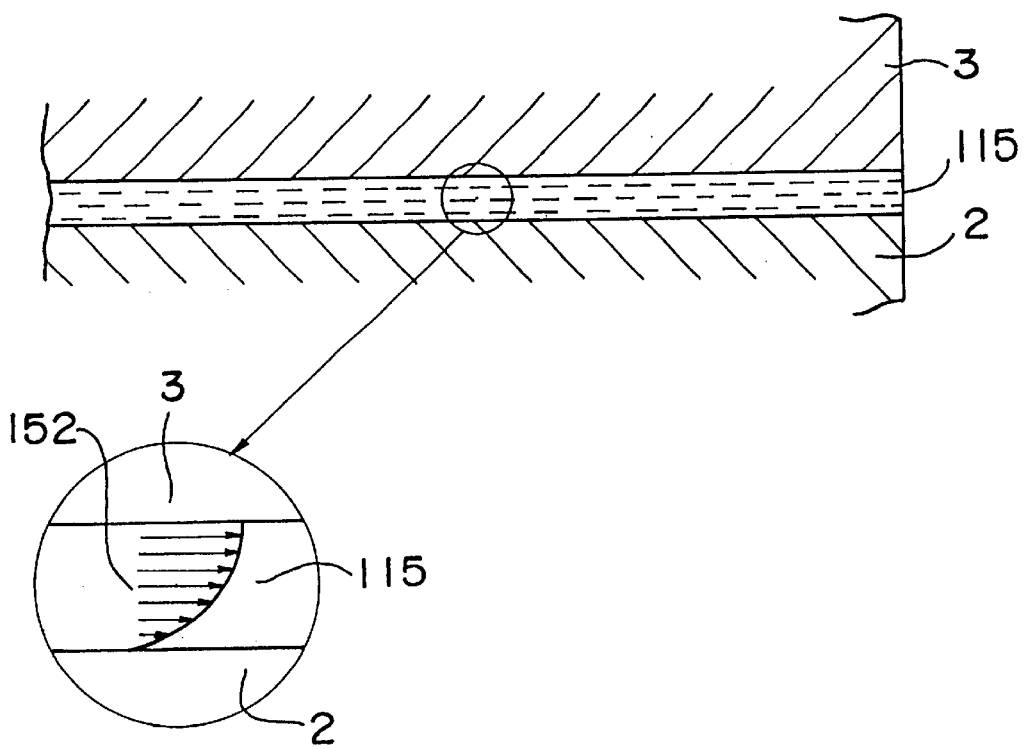
FIG. 5 is a sectional view of a further modified example of the stamper protecting layer of FIG. 1.
Figure 6:
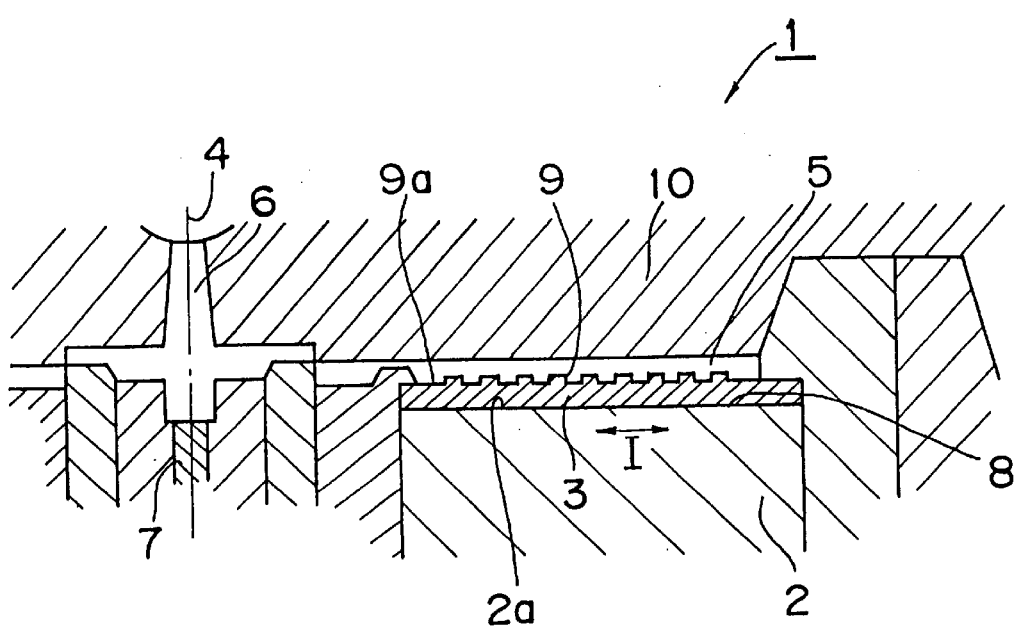
FIG. 6 is a sectional view showing a structure of a conventional optical disk molding apparatus.
Figure 7:
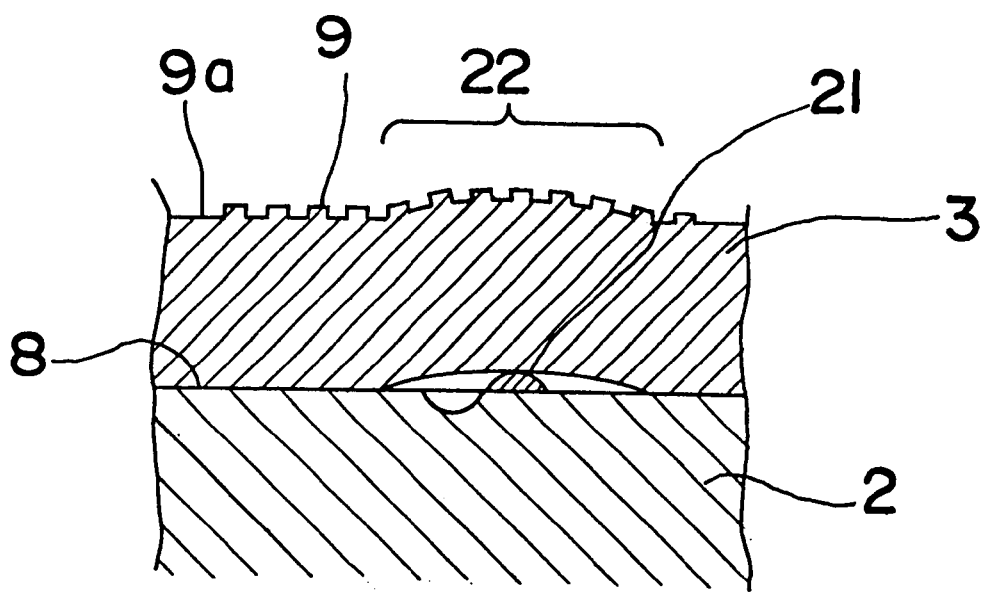
FIG. 7 is a diagram explanatory of a projecting part formed on the stamper of the conventional optical disk molding apparatus.

Specifically referring to FIG. 5, a layer of fatty acid is directly formed as a wear preventing liquid 115 by spin coating to the contact face of the stamper 3 and mold 2.

With the employment of the wear preventing liquid 115 as well, similar to the foregoing embodiments, the stamper 3 is extended and shrunk in the I direction when the resin material is filled in the cavity 5. However, the wear preventing liquid 115 of the fatty acid layer which is liquid when the resin is filled intervenes at the microscopic projections described earlier in the contact face 8 of the stamper 3 and mold 2, to thereby prevent the stamper 3 and mold 2 from colliding in direct contact with each other and sliding in contact with each other. A force 152 deforming the wear preventing liquid 115 indicated in FIG. 5 is increased at the side of the mold 2 while increased at the side of the stamper 3. The friction coefficient of the stamper 3 to the mold 2 is reduced and the friction force itself is lowered because of the wear preventing liquid 115. Metallic particles resulting from the contact of the stamper 3 and mold 2 are eliminated, not diffusing in the wear preventing liquid 115 of the fatty acid. The stamper 3 is kept in an initial composition, so that mechanical characteristics of the stamper 3 are maintained for a long term.

For the liquid containing the fatty acid, for instance, nondrying oil including oleic acid such as camellia oil, olive oil or the like is utilizable. Since the fatty acid is resistive to heat, holds stability of components for a long time, does not contain moisture and is not a mineral oil, such inconvenience as are inherent in the conventionally used fats and oils or lubricant oil are avoided.

Although merely approximately 30,000 optical disks are manufactured by a single stamper 3 in the prior art, the present structure provided with the wear preventing member 114 or the wear preventing liquid 115 enables the manufacture of nearly 200,000 optical disks, improving productivity, and quality and yield of products.

When the fatty acid as the wear preventing liquid 115 is applied to the stamper 3 or mold 2, particular attention should be taken not to adhere foreign matter such as dust or the like to the stamper 3 and mold 2. The application of the fatty acid is required to be carried out at a clean bench, etc. having local cleanliness.

Each of the stamper protecting layer using the wear preventing member 112, stamper protecting layer with the reaction preventing materials 113 added at the front and rear faces 112*a*, 112*b* of the wear preventing member 112, stamper protecting layer with the wear preventing member 114 at the stamper 3, and stamper protecting layer using the wear preventing liquid 115 can be installed not only between the stamper 3 and mold 2, but at every gap of the stamper, mold and cassette in the case of a cassette-type mold. The same effect as described earlier is achieved also in such arrangement.

The entire disclosure of Japanese Patent Application No. 9-98725 filed on Apr. 16, 1997, including specification, claims, drawings, and summary are incorporated herein by reference in its entirety.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An optical disk molding method comprising:

injecting a resin material into a plurality of molds to mold an optical disk, the plurality of molds having a stamper protecting layer between a first mold of the plurality of molds and a stamper fitted to the first mold, the stamper being adapted to form pits on the optical disk;

while said injecting of the resin material occurs, changing physical properties of the stamper protecting layer at a temperature not higher than an injection temperature of the resin material, the physical properties being that the stamper protecting layer has a melting point not higher than the injection temperature and that the stamper projecting layer is melted or softened at the injection temperature; and absorbing the forces generated by extension and shrinkage of the stamper in a diametrical direction of the stamper with the stamper protecting layer when the resin material is injected to prevent the stamper from being deformed, wherein the stamper protecting layer is a wear preventing member of metal, and a reaction preventing material is provided between the first mold and the wear preventing member, and between the stamper and the wear preventing member, the reaction preventing material preventing a chemical reaction between the wear preventing member and the first mold, and the wear preventing member and the stamper.

2. An optical disk molding method according to claim 1, wherein the injection temperature is 370° C.

3. An optical disk molding method according to claim 1, wherein the reaction preventing material is a compound containing at least one of carbon, boron and nitrogen.

* * * * *